United States Patent [19]

Santos et al.

[11] Patent Number: 4,987,415
[45] Date of Patent: Jan. 22, 1991

[54] HIGH RESOLUTION ENCODER

[75] Inventors: A. John Santos, Canton Center; Michael C. Brauer, Goshen, both of Conn.

[73] Assignee: The Torrington Company, Torrington, Conn.

[21] Appl. No.: 408,592

[22] Filed: Sep. 18, 1989

[51] Int. Cl.[5] .......................... H03M 1/22; G01P 3/42
[52] U.S. Cl. ...................................... 341/15; 341/171; 29/607
[58] Field of Search ................. 318/652; 341/15, 171; 29/602.1, 607, 608, 609

[56] References Cited

U.S. PATENT DOCUMENTS

| 3,727,302 | 4/1973 | Phelon | 29/607 X |
| 4,746,862 | 5/1988 | Ueki | 341/15 X |
| 4,897,914 | 2/1990 | Loubier | 29/602.1 |
| 4,899,145 | 2/1990 | Okuda et al. | 341/171 X |

FOREIGN PATENT DOCUMENTS

| 58-154614 | 9/1983 | Japan | 341/15 |
| 58-198760 | 11/1983 | Japan | 341/15 |
| 60-192214 | 9/1985 | Japan | 341/15 |
| 63-228707 | 9/1988 | Japan | 29/607 |

Primary Examiner—Bentsu Ro
Attorney, Agent, or Firm—Frank S. Troidl

[57] ABSTRACT

A high resolution encoder having a relatively high number of magnetic pole pairs with a magnetic flux strength sufficient for use in high resolution applications. Magnetic pole pair spacing varies from about 0.010 inch to about 0.050 inch with each magnetic pole pair having a magnetic flux in the range of about 2 gauss to about 700 gauss at a distance of 0.036 inch at a temperature of +20 degrees centigrade. This high resolution encoder is especially well-suited for use with magnetically encoded targets in sensor bearings.

14 Claims, 2 Drawing Sheets

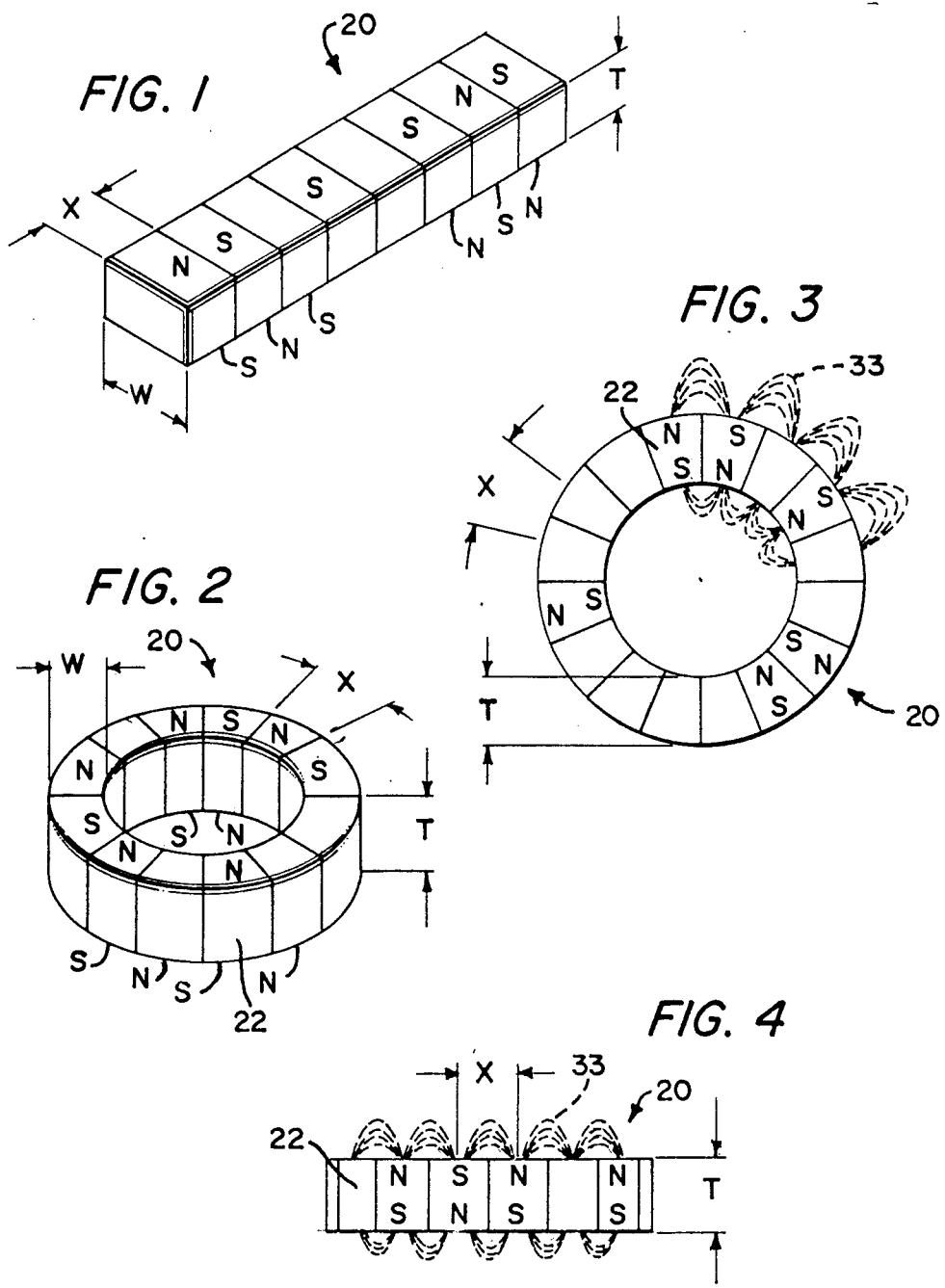

HIGH RESOLUTION ENCODER

This invention relates to encoders which provide a relatively high number of magnetic pole pairs with a threshold magnetic flux strength for use in high resolution applications. This invention is especially well-suited for use with magnetically encoded targets in sensor bearings capable of providing relatively high resolution output signals, as required in various automotive applications.

This invention can be utilized with elongated encoders or with annular encoders or with encoders having other configurations, depending on the specific application. For example, an elongated encoder could be used to determine the position of the rod portion of a shock absorber. When used in sensor bearings, the encoders of the present invention are designed to provide a one-piece unit which can be installed in a bearing having an outer race and an inner race, or a stationary thrust plate and a rotating thrust plate. This invention is suitable for use with bearings having a wide range of designs, including ball bearings, roller bearings, tapered roller bearings, and needle bearings. Either thrust or radial bearing configurations may be utilized; in addition, tapered bearings are included. Antifriction bearings having rolling elements, with or without a cage or retainer or separator, are included, as well as plain bearings having no rolling elements.

Conventional bearing encoders normally utilize a much smaller number of North-South magnetic pole pairs (MPP) than the maximum possible number of MPP. A smaller number of MPP results in a lower resolution. Techniques for maximizing the number of poles are not normally explored, since relatively low resolutions are acceptable for many automotive bearing products which incorporate an encoder. Maximizing the number of MPP decreases the pole spacing between adjacent pole pairs, thus decreasing the magnetic flux density emanating from each MPP. Therefore, if a particular minimum flux density is required for a specific product application, care must be taken to ensure that too many MPP are not placed on an encoder so as to decrease the flux density to an unacceptably low value. The easiest way to ensure adequate flux density is to keep the pole spacing relatively large, which results in a relatively low number of MPP. Again, this is no problem when the resolution requirements for a specific application are not stringent; however, if relatively high resolution is a requirement, then the encoder of the present invention is extremely useful.

A typical encoder for a prior art sensor bearing has a minimum pole spacing of approximately 0.150 inch, which corresponds to about 40 magnetic pole pairs for an annular encoder with a diameter of about two inches. An example of of the prior art is disclosed in U.S. Pat. No. 4,732,494 for a "Bearing or Roller Bearing With Data Sensor" issued on Mar. 22, 1988, in the names of Roger Guers and Georges Godard.

The encoders of this invention provide a relatively high number of MPP precisely positioned on a magnetizable member in order to satisfy high resolution application requirements. More importantly, each total number of MPP for an encoder has an optimal magnetic flux density associated with each pole pair. This flux density-MPP number combination has a unique and novel range of values for specific applications, such as bearings. An equation which describes this flux relationship in terms of pole spacing follows:

$$F_r = (K_1)(X) - (K_2)(140 X^2) + (K_3)(7920 X^3)$$

where
- $K_1$ = 158 to 1056 gauss per inch,
- $K_2$ = 158 to 1056 gauss per inch$^2$,
- $K_3$ = 158 to 1056 gauss per inch$^3$,
- X = Pole Spacing between adjacent MPP, and
- $F_r$ = Reference magnetic flux density range (in gauss) at +20 degrees Centigrade, when the numerical values of $K_1$, $K_2$, and $K_3$ are equal.

This equation is good for an air gap of 0.036 inch between the outer surface of the encoder and the sensitive portion of the sensor. All magnetic flux densities herein are measured with a Hall sensor through the same size air gap of 0.036 inch. The equation is also good for most magnetic materials, such as strontium ferrite, barium ferrite, samarium-cobalt, or neodymium-iron-boron.

An annular encoder's number of MPP can easily be determined, since $$\text{Number of MPP} = (D)(\pi)/X$$

where,
- D = Diameter of annular encoder, and
- X = Pole Spacing

Briefly described, the encoder of the present invention comprises a magnetizable member having multiple magnetic pole pairs (MPP) spaced along the member at equal intervals. The encoder has a relatively high number of MPP, and each of these MPP has a predetermined minimum or threshold magnetic flux density. This is important, for example, to ensure that a Hall sensor installed in the proximity of the encoder will switch on and off through an air gap which has some maximum value for a specific product configuration. This relatively high number of MPP, each having a minimum or threshold magnetic flux density, provides relatively high resolution capabilities to the product.

The method of magnetizing the encoder involves the following basic steps:

(a) studying the specific application requirements in order to determine the number of magnetic pole pairs (MPP) required to get the resolution desired and to determine which encoder configuration is most suitable for that particular application;

(b) determining the maximum air gap associated with that specific encoder configuration for that specific application;

(c) determining the minimum or threshold magnetic flux density required to ensure that the sensor will switch on and off through the maximum air gap condition, with worst-case conditions for any other known variables such as temperature;

(d) determining which magnetic materials would suffice to manufacture the encoder so that a sufficient number of MPP will be placed on the encoder, each MPP having a precise placement and a magnetic flux density at least equal to the value determined in step (c) above, so that the high resolution requirements of the specific application are met;

(e) selecting from the group of eligible magnetic materials, determined in step (d) above, to provide the optimal material which is most cost efficient and will meet the performance requirements of that particular application; and (f) magnetizing an annular member made from the optimal material, selected in step (e) above, with at least the number of MPP required for that specific high resolution applition so that each MPP has a magnetic flux density at least equal to the value determined in step (c) above.

This invention, as well as its many advantages, may be further understood by reference to the following detailed description and drawings in which:

FIG. 1 is a perspective view of an elongated encoder of the present invention;

FIG. 2 is a perspective view of an annular encoder, suitable for use in a thrust bearing, of the present invention;

FIG. 3 is an axial end view of an annular encoder, showing the magnetic pole pairs spaced circumferentially around an encoder used in a radial bearing;

FIG. 4 is a radial side view of the encoder in FIG. 2, illustrating the magnetic flux emanating from magnetic poles of an encoder used in a thrust bearing;

Figure 5:
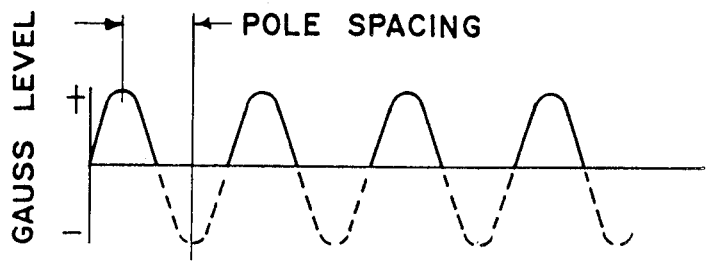
FIG. 5 is an illustration of the magnetic flux density sinusoidal output curve resulting from the encoders shown in FIGS. 1-4.

Referring to the drawings and more particularly to FIGS. 1 and 2, the preferred embodiment of this invention comprises an encoder 20 which can have an elongated configuration, as shown in FIG. 1, or an annular configuration as shown in FIG. 2. In either case, encoder 20 has multiple magnetic pole pairs (MPP) 22 positioned at equally spaced intervals along the encoder. The encoder must made of metal a magnetizable material. The preferred material is a synthetic material which has been "loaded" with a highly magnetizable material, such as strontium ferrite or barium ferrite. Other loading materials capable of providing higher magnetic flux densities per volume of material can be used, e.g., neodymium-iron-boron or samarium-cobalt, but strontium ferrite and barium ferrite will normally provide a sufficient magnetic flux density at less expense and are therefore preferred from a cost-efficiency point of view. The "loading factor" is the percentage, by volume, of magnetizable material loaded into an encoder. For example, a synthetic resin encoder with an 33% strontium ferrite loading factor would consist of 33% strontium ferrite, by volume, and 67% synthetic resin, also by volume. The magnetic flux density will vary linearly and proportionately with the loading factor. For example, a strontium ferrite encoder with a loading factor of 33% would have a magnetic flux density ($F_{33}$) which varies with the loading factor according to the equation:

$$F = (K/0.33) \times (F_{33})$$

F = Magnetic flux density corrected for loading factor K $F_{33}$ = Magnetic flux density for 33% loading factor, and K = Loading factor of the encoder An encoder with an 80% loading factor will have a magnetic flux density about twice that of a similar encoder with a 40% loading factor. In addition, if an encoder made of neodymium-iron-boron has a magnetic flux density about 1.6 times as strong as that of a similar encoder made of strontium ferrite, both having the same loading factor, then a neodymium-iron-boron encoder with a 100% loading factor would have a magnetic flux density which is stronger than that of a strontium ferrite encoder, with an 33% loading factor, by a factor of 1.6/0.33 or about 4.8.

The MPP can be oriented in various directions, depending on the product configuration. FIGS. 3 and 4 illustrate typical MPP orientations for a radial bearing encoder and a thrust bearing encoder, respectively. The magnetic flux fields 33 are also depicted in phantom lines in FIGS. 3 and 4. The peak flux 33 for a radial bearing encoder extends radially outwardly from the encoder, as shown in FIG. 3. In contrast, the thrust bearing encoder of FIG. 4 has its maximum flux density emanating axially from the encoder. The most dense portion of the magnetic flux field is normally oriented in the direction of a magnetic flux detector or sensor in order to optimize the sensitivity of the sensor for a specific product configuration. The orientation of the sensor itself will depend to some degree upon the type of sensor used; for example, a Hall sensor mounted on an integrated circuit (I.C.) chip would be mounted perpendicularly relative to the surface of the encoder being sensed. In contrast, a magnetoresistor sensor mounted on an I.C. chip would be rotated 90 degrees from the orientation of a Hall sensor chip, in order to provide optimal sensing of the encoder's magnetic flux. As discussed above, the flux density numbers provided herein have resulted from using a Hall sensor whose sensitive portion has been positioned approximately 0.036 inch from the encoder surface being measured.

The density of the magnetic flux must be sufficient to allow the sensor to detect the flux during the worst-case conditions, i.e., with a maximum air gap between the encoder and the sensor, at a maximum temperature. The primary factor which can be controlled in order to provide a desired threshold flux density is the loading factor, which is the amount of magnetizable material, by volume, loaded into a synthetic base material.

The method of magnetizing the encoder involves the same basic steps as described above.

Various products and applications have different resolution requirements. In discussing the resolution of an encoder, the key parameter is the number of magnetic pole pairs (MPP), which is closely related to the pole spacing. FIG. 5 illustrates what is meant by pole spacing by referring to the magnetic field produced by the MPP; in addition, FIGS. 3 and 4 depict the pole spacing dimension with the letter "X". Pole spacing refers to the distance between adjacent MPP, e.g., from the peak flux density of a North pole to the peak flux density of an adjacent South pole. Deciding which encoder configuration to use for a specific application entails many factors other than the resolution. For example, in a sensor bearing product application, consideration must be given to whether a radial bearing or a thrust bearing is necessary. In addition, the load to be carried by the bearing factors into the type of bearing to be used, i.e., a ball bearing or a roller bearing, etc. Other factors would include whether or not to use roller elements at all, and if so, whether to use a cage or a retainer or a separator. Last, but not least, the final factor must be whether the optimal product configuration can utilize an encoder configuration which provides the resolution required. If not, another product configuration must be used.

In addition to the resolution requirement, another condition which must be met is the magnetic flux requirement. Even if the number of MPP required for a certain resolution can be provided, each MPP must also provide a minimum or threshold magnetic flux density under worst-case conditions in order to ensure that the sensor used will detect the flux and produce a sufficient output signal as a result. For example, if the temperature range within which a product must operate is known, the highest possible temperature is used to calculate the magnetic flux density, because the flux density decreases as the temperature increases, according to the following equation:

$$F_t = (F_r)\{1 - (K)(\Delta T)\}$$

where $F_t$ = Magnetic flux density corrected for actual temperature,
$F_r$ = Magnetic flux density at reference temperature,
$K$ = Thermal coefficient for a specific material, and
$\Delta T$ = Actual temperature - reference temperature.

The thermal coefficient for strontium ferrite and barium ferrite is about 0.18% per degree Centigrade; therefore, the equation for strontium or barium ferrite is:

$$F_t = (F_r)\{1 - (0.18\% \text{ per degree C.})(\Delta T)\}$$

Therefore, if the threshold flux density is provided at the highest temperature which the product will endure, then the sensor will provide an adequate output signal under the worst temperature conditions. Any other factors, in addition to temperature, which would affect the magnetic flux density are similarly accounted for when determining the threshold magnetic flux density.

Magnetizable materials are then considered in order to determine which material is optimal for providing the number of MPP and flux density combination derived in steps (a) through (c) above. Various rare earth magnets, such as neodymium-iron-boron magnets, can provide especially strong magnetic flux densities with a minimal amount of material; however, their cost is higher than some weaker materials, such as strontium ferrite and barium ferrite. The least expensive material which meets the resolution-flux requirements is normally chosen as the optimal material.

For example, in many automotive applications an encoder made of strontium ferrite or barium ferrite would normally provide a sufficient number of MPP with adequate magnetic flux densitites; therefore, these materials would be used for these applications, instead of a stronger but more expensive material, such as samarium-cobalt.

Once the material is selected, an encoder is manufactured by shaping the material to the desired encoder configuration and magnetizing the material with the number of MPP required to get the resolution desired. For example, an annular encoder, such as encoder 20 in FIGS. 2 through 4, could have 360 MPP magnetized into a 2.6 inch diameter annular ring of strontium ferrite material. This encoder would be capable of providing a magnetic flux density of approximately 10 gauss, at a distance of approximately 0.036 inch from the surface of the magnet. The encoder has a pole spacing of about 0.023 inch, and a thickness (T) of 0.028 inch.

The thickness (T) of an encoder is an important variable because the magnetic flux generated by the encoder can be maximized for a fixed amount of encoder material by optiizing the ratio of the encoder thickness and the pole spacing. Research conducted by these inventors indicates that a ratio of about 1.25 is optimal, i.e., the thickness of the encoder must be about 1.25 times the pole spacing dimension. A ratio range of 1.25+/−25% has been found to be acceptable for many product applications. FIGS. 3 and 4 clarify the thickness (T) and pole spacing (X) dimensions for annular encoders used in radial bearings and thrust bearings, respectively.

Figure 6:
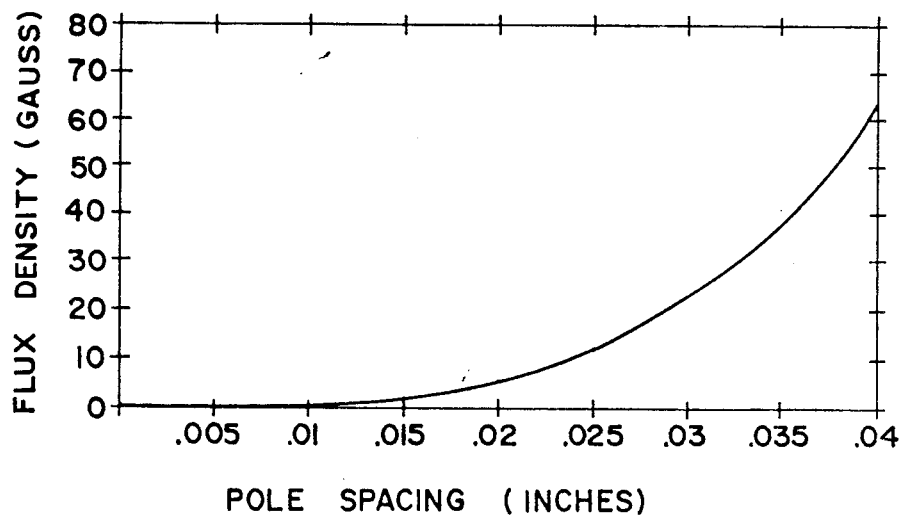
FIG. 6 is a graph showing the minimum pole spacing which can be obtained for a corresponding magnetic flux density.

FIG. 6 graphs the optimal pole spacing-magnetic flux density relationship discussed above. For a required threshold magnetic flux density for a known air gap, the largest usable pole spacing can be determined from the graph. This pole spacing will provide a specific number of MPP. For example, once the pole spacing for a given flux density is determined, the number of MPP which can be magnetized into an annular encoder can be calculated using the following equation:

$$\text{Number of MPP} = (D)(\pi)/X$$

where $D$ = Diameter of the annular encoder, and
$X$ = Pole spacing.

A range of 80% to 100% of the number of MPP calculated for a particular encoder, for a given flux density, is considered to be an improvement over the existing prior art. The graph in FIG. 6 was developed using synthetic resin encoders made of strontium ferrite with an 33% loading factor. Flux density measurements were made at +20 degrees Centigrade, with an air gap of 0.036 inch between the outer surface of the encoder and the sensitive portion of a Hall sensor.

I claim:

1. An encoder comprising a magnetizable member having a thickness and a width, and multiple magnetic pole pairs (MPP) spaced at equal intervals along said member, said MPP having a pole spacing between adjacent pole pairs, said pole spacing having a range of values from about 0.010 inch to about 0.050 inch, each of said MPP having a reference magnetic flux density ($F_r$) value in the range of about 2 gauss to about 700 gauss at a distance of 0.036 inch from the encoder surface at a temperature of about +20 degrees Centigrade, each of said $F_r$ values being related to a range of pole spacing values by the equation:

$$F_r = (K_1)(X) - (K_2)(140X^2) + (K_3)(7920X^3),$$

where $K_1$ = 158 to 1056 gauss per inch,
$K_2$ = 158 to 1056 gauss per inch$^2$,
$K_3$ = 158 to 1056 gauss per inch$^3$,
$X$ = Pole Spacing between adjacent MPP, and
$F_r$ = Reference magnetic flux density range (in gauss) at +20 degrees Centigrade, when the numerical values of $K_1$, $K_2$, and $K_3$ are equal.

2. An encoder according to claim 1, wherein said temperature varies within a range of about −40 degrees Centigrade to about +200 degrees Centigrade, and said reference magnetic flux density ($F_r$) varies with temperature according to the following equation:

$$F_t = (F_r)\{1 - (K_4)(\Delta T)\}$$

where $F_r$ = Reference magnetic flux density (in gauss) at 20 degrees Centigrade
$F_t$ = Temperature-specific magnetic flux density
$\Delta T$ = Actual temperature minus 20 degrees Centigrade: and
$K_4$ = Temperature coefficient for said magnetizable member.

3. An encoder according to claim 1, wherein said thickness of said member is optimized by making said thickness equal to a factor of 1.25 times the pole spacing, which corresponds to a range of member thicknesses from about 0.0125 inch to about 0.0625 inch.

4. An encoder according to claim 3, wherein said thickness factor varies by +/−25%.

5. An encoder comprising a magnetizable member made with a material from the group consisting of strontium ferrite and barium ferrite, with a loading factor of 33%, said member having a thickness and a width, and multiple magnetic pole pairs (MPP) spaced at equal intervals along said member, said MPP having a pole spacing between adjacent pole pairs, said pole spacing having a range of values from about 0.010 inch to about 0.050 inch, each of said MPP having a reference magnetic flux density ($F_r$) value in the range of about 2 gauss to about 158 gauss at a distance of 0.036 inch from the encoder surface at a temperature of about +20 degrees Centigrade, each of said $F_r$ values being related to a range of pole spacing values by the equation:

$$F_r = (K_5)(X) - (K_6)(140X^2) + (K_7)(7920X^3),$$

where
$K_5$ = 158 to 230 gauss per inch,
$K_6$ = 158 to 230 gauss per inch$^2$,
$K_7$ = 158 to 230 gauss per inch$^3$,
X = Pole Spacing between adjacent MPP, and
$F_r$ = Reference magnetic flux density range (in gauss) at +20 degrees Centigrade, when the numerical values of $K_5$, $K_6$, and $K_7$ are equal.

6. An encoder according to claim 5, wherein said temperature varies within a range of about −40 degrees Centigrade to about +200 degrees Centigrade, and said reference magnetic flux density ($F_r$) varies with temperature according to the following equation:

$$F_t = (F_r)\{1 - (K_8)(\Delta T)\}$$

where
$F_r$ = Reference Magnetic flux density at 20 degrees Centigrade and an 33% loading factor;
$F_t$ = Temperature-specific magnetic flux density with an 33% loading factor;
$\Delta T$ = Actual temperature minus 20 degrees Centigrade; and
$K_8$ = Temperature coefficient for strontium ferrite and barium ferrite (about 0.18% per degree Centigrade).

7. An encoder according to claim 6, wherein said temperature-specific magnetic flux density ($F_t$) varies with said loading factor according to the following equation:

$$F = (K_9/0.33) \times (F_t)$$

where
F = Magnetic flux density for a specific temperature and loading factor, and
$K_9$ = Actual loading factor for strontium ferrite or barium ferrite.

8. An encoder according to claim 5, wherein said thickness of said member is optimized by making said thickness equal to a factor of 1.25 times the pole spacing, which corresponds to a range of member thickness from about 0.0125 inch to about 0.0625 inch.

9. An encoder according to claim 8, wherein said thickness factor varies by +/−25%.

10. An encoder comprising an annular member made with a material from the group consisting of strontium ferrite and barium ferrite with a loading factor of 33%, having multiple magnetic pole pairs (MPP) circumferentially separated and circumferentially spaced around said annular member and having a pole spacing of 0.010 inch, said encoder having an outer surface with a diameter in the range of about 0.50 inch to about 8.00 inches, and each of said MPP having a reference magnetic flux density ($F_r$) in the range of about 2 gauss to about 158 gauss at a distance of 0.036 inch from said encoder surface at a temperature of about +20 degrees Centigrade, each of said flux density values being related to a range of pole spacing values by the equation:

$$F_r = (K_5)(X) - (K_6)(140X^2) + (K_7)(7920X^3)$$

where
$K_5$ = 158 to 230 gauss per inch,
$K_6$ = 158 to 230 gauss per inch$^2$,
$K_7$ = 158 to 230 gauss per inch$^3$,
X = Pole Spacing between adjacent MPP, and
$F_r$ = Reference magnetic flux density range (in gauss at +20 degrees Centigrade, when the numerical values of $K_5$, $K_6$, and $K_7$ are equal.

11. An encoder according to claim 10, wherein said temperature varies within a range of about −40 degrees Centigrade to about +200 degrees Centigrade, and said reference magnetic flux density ($F_r$) varies with temperature according to the following equation:

$$F_t = (F_r)\{1 - (K_8)(\Delta T)\}$$

where
$F_r$ = Reference Magnetic flux density at 20 degrees Centigrade and an 33% loading factor;
$F_t$ = Temperature-specific magnetic flux density with an 33% loading factor;
$\Delta T$ = Actual temperature minus 20 degrees Centigrade; and
$K_8$ = Temperature coefficient for strontium ferrite and barium ferrite = 0.18% per degree Centigrade.

12. An encoder according to claim 11, wherein said temperature-specific magnetic flux density ($F_t$) varies with said loading factor according to the following equation:

$$F = (K_9/0.33) \times (F_t)$$

where
F = Magnetic flux density for a specific temperature and loading factor, and
$K_9$ = Actual loading factor for strontium ferrite or barium ferrite 13. An encoder according to claim 10, wherein said thickness of said member is optimized by making said thickness equal to a factor of 1.25 times the pole spacing, which corresponds to a thickness of about 0.125 inch.

14. An encoder according to claim 13, wherein said thickness factor varies by +/−25%.

* * * * *